(12) United States Patent
Schlomann et al.

(10) Patent No.: US 8,588,862 B2
(45) Date of Patent: Nov. 19, 2013

(54) ALERT SLEEP AND WAKEUP FOR A MOBILE STATION

(75) Inventors: John W. Schlomann, Elgin, IL (US); John M. Burgan, North Palm Beach, FL (US); Zbigniew J. Kuczun, Mount Prospect, IL (US)

(73) Assignee: Motorola Mobility LLC, Libertyville, IL (US)

( * ) Notice: Subject to any disclaimer, the term of this patent is extended or adjusted under 35 U.S.C. 154(b) by 993 days.

(21) Appl. No.: 11/467,917

(22) Filed: Aug. 28, 2006

(65) Prior Publication Data

US 2008/0051154 A1 Feb. 28, 2008

(51) Int. Cl.
*H04M 1/00* (2006.01)

(52) U.S. Cl.
USPC ........... 455/567; 455/418; 455/466; 455/550; 340/825.49; 340/691.1; 379/207.16; 379/215.01; 709/206; 342/450

(58) Field of Classification Search
USPC .............. 455/567, 418, 466, 550.1, 424, 425, 455/456.5, 456.6, 561, 575.1, 556, 456, 455/457, 458; 340/825.49, 691.1, 407.1, 340/407.2, 825.44, 825.14, 311.3; 379/207.16, 215.01, 88.21, 88.26, 379/142.08, 210.01, 211.02, 214.01; 709/206; 342/450
See application file for complete search history.

(56) References Cited

U.S. PATENT DOCUMENTS

| | | | |
|---|---|---|---|
| 5,696,497 A | 12/1997 | Mottier et al. | |
| 6,252,515 B1 | 6/2001 | Mottier et al. | |
| 6,252,516 B1 | 6/2001 | Mottier et al. | |
| 6,549,792 B1 * | 4/2003 | Cannon et al. | 455/550.1 |
| 6,717,520 B1 | 4/2004 | Dorenbosch | |
| 6,822,565 B2 * | 11/2004 | Thomas et al. | 340/539.1 |
| 6,847,892 B2 * | 1/2005 | Zhou et al. | 701/213 |
| 6,940,407 B2 | 9/2005 | Miranda-Knapp et al. | |
| 6,965,863 B1 * | 11/2005 | Zuberec et al. | 704/270 |
| 7,027,840 B2 * | 4/2006 | McKee et al. | 455/567 |
| 7,084,756 B2 * | 8/2006 | Stilp | 340/539.1 |
| 7,248,915 B2 * | 7/2007 | Ronnholm | 600/544 |
| 7,352,854 B1 * | 4/2008 | Silver | 379/207.16 |
| 7,366,548 B2 * | 4/2008 | Del Signore | 455/567 |
| 7,439,872 B2 * | 10/2008 | Hiltunen | 340/691.1 |
| 7,660,658 B2 * | 2/2010 | Sheynblat | 701/93 |
| 2003/0184474 A1 * | 10/2003 | Bajikar | 342/450 |
| 2004/0225901 A1 * | 11/2004 | Bear et al. | 713/300 |
| 2005/0059435 A1 * | 3/2005 | McKee et al. | 455/567 |
| 2005/0090290 A1 * | 4/2005 | Hama et al. | 455/566 |
| 2005/0164633 A1 * | 7/2005 | Linjama et al. | 455/41.2 |
| 2005/0195952 A1 | 9/2005 | Dyer et al. | |
| 2006/0017692 A1 | 1/2006 | Wehrenberg et al. | |
| 2006/0052109 A1 * | 3/2006 | Ashman et al. | 455/440 |
| 2006/0105817 A1 * | 5/2006 | Naick et al. | 455/567 |
| 2006/0148490 A1 * | 7/2006 | Bates et al. | 455/456.1 |

(Continued)

*Primary Examiner* — Hai V Nguyen

(57) ABSTRACT

A mobile station (200) that includes a transceiver (210) that receives an alert request (105) and a controller (205). Responsive to the alert request, the controller can enter the mobile station into an alert active mode in which an alert signal is generated on the mobile station. Responsive to not receiving an acknowledgement to the alert signal within a defined period, the controller can enter the mobile station into an alert sleep mode in which at least one parameter of the alert signal is changed. Further, the controller can awake the mobile station from the alert sleep mode in response to detecting a user presence. The mobile station further can include an accelerometer (270) and/or a positioning system (275) that detect the user presence by detecting movement of the mobile station.

22 Claims, 2 Drawing Sheets

(56) References Cited

U.S. PATENT DOCUMENTS

| | | | |
|---|---|---|---|
| 2006/0179450 A1* | 8/2006 | Trappeniers et al. | 725/9 |
| 2006/0293037 A1* | 12/2006 | Signore | 455/417 |
| 2007/0037610 A1* | 2/2007 | Logan | 455/574 |
| 2007/0061403 A1* | 3/2007 | Seaburg | 709/206 |
| 2007/0281725 A1* | 12/2007 | Hyatt | 455/519 |

* cited by examiner

ALERT SLEEP AND WAKEUP FOR A MOBILE STATION

BACKGROUND OF THE INVENTION

1. Field of the Invention

The present invention generally relates to mobile stations and, more particularly, to mobile stations which include sleep and wakeup modes.

2. Background of the Invention

FIG. 1 presents a communications system 100 that provides an alert feature. The alert feature allows an alert request 105 to be communicated by a remote caller, such as a user of a mobile station 110, who is calling a mobile station 115 that does not respond to the call attempt. The alert request 105 can be communicated from the mobile station 110 to the mobile station 115 via a communications network 120.

When the alert request 105 is received by the mobile station 115, an alert signal 125 typically is generated by an audio transducer (e.g. loudspeaker) within the mobile station. The alert signal 125 usually can be heard by people who are in the general vicinity of the mobile station 115, and can continue until a user input is entered to end the alert. Thus, if a user happens to be away from his mobile station 115 when an important call is received and an alert request 105 is received, the user can be notified of the call as soon as the user returns to an area within the vicinity of his mobile station 115. Unfortunately, the alert 125 can be irritating to other people who are in the vicinity of the mobile station 115, especially if the alert 125 continues for a significant length of time.

SUMMARY OF THE INVENTION

The present invention relates to a method of generating an alert on a mobile station. The method can include generating an alert signal on the mobile station in an alert active mode. In response to not receiving an acknowledgement to the alert signal within a defined period, the mobile station can enter into an alert sleep mode in which at least one parameter of the alert signal is changed. The mobile station can be awakened from the alert sleep mode in response to detecting a user presence.

Generating the alert signal can include generating an acoustic alert signal. The parameter that is changed can be an activation status of the acoustic alert signal, a volume of the acoustic alert signal, a frequency of the acoustic alert signal, and/or a rate of repetition of the acoustic alert signal. In another arrangement, generating the alert signal can include generating a visual alert signal, and the parameter that is changed can be an activation status of the visual alert signal, an intensity of the visual alert signal, a color of the visual alert signal, and/or a rate of repetition of the visual alert signal. Entering the mobile station into the alert sleep mode can include generating a vibration alert signal.

Detecting the user presence can include detecting movement of the mobile station. Detecting movement of the mobile station can include detecting an acceleration of the mobile station, detecting a positioning signal, such as a global positioning satellite signal, and/or detecting a presence of the mobile station in a cell that is different than a cell in which the mobile station was present when the alert was generated. Detecting the user presence also can include detecting user activity via a user interface.

The present invention also relates to a mobile station that includes a transceiver that receives an alert request and a controller. Responsive to the alert request, the controller can enter the mobile station into an alert active mode in which an alert signal is generated on the mobile station. Responsive to not receiving an acknowledgement to the alert signal within a defined period, the controller can enter the mobile station into an alert sleep mode in which at least one parameter of the alert signal is changed. Further, the controller can awake the mobile station from the alert sleep mode in response to detecting a user presence.

The mobile station also can include an audio processor that generates the alert signal as an acoustic alert signal. The parameter that is changed can be an activation status of the acoustic alert signal, a volume of the acoustic alert signal, a frequency of the acoustic alert signal, and/or a rate of repetition of the acoustic alert signal. In another arrangement, the mobile station can include a lamp controller that generates the alert signal as a visual alert signal. In such an arrangement, the parameter that is changed can be an activation status of the visual alert signal, an intensity of the visual alert signal, a color of the visual alert signal, and/or a rate of repetition of the visual alert signal.

The mobile station also can include a haptic controller and a vibration module operatively coupled to the haptic controller. The haptic controller can provide one or more signals to the vibration module to initiate vibration of the mobile station in the alert sleep mode.

The mobile station further can include an accelerometer that detects the user presence by detecting movement of the mobile station, and/or a positioning system that detects the user presence by detecting movement of the mobile station. The positioning system can include a global positioning satellite receiver. In another arrangement, the mobile station can detect a user presence by detecting a presence of the mobile station in an area or cell that is different than an area or cell in which the mobile station was present when the alert was generated. The mobile station also can include a user interface and user presence can be detected by detecting user activity via the user interface.

The present invention also relates to a mobile station that includes a transceiver that receives an alert request, an accelerometer that detects movement of the mobile station and a controller. The controller can, in response to the alert request, enter the mobile station into an alert active mode in which an alert signal is generated on the mobile station. In response to not receiving an acknowledgement to the alert signal within a defined period, the controller can enter the mobile station into an alert sleep mode in which at least one parameter of the alert signal is changed. Further, in response to the accelerometer detecting movement of the mobile station, the controller can awake the mobile station from the alert sleep mode.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a mobile station that is operable between an alert active mode and an alert sleep mode. The mobile station can enter the alert active mode when an alert is initiated. In the alert active mode, the mobile station can generate an alert signal, which can be an acoustic alert signal or a visual alert signal. In response to not receiving an acknowledgement to the alert signal within a defined period, the mobile station can enter into an alert sleep mode in which at least one parameter of the alert signal is changed with respect to the alert active mode. For example, the alert can be deactivated or changed to a vibration alert. Accordingly, people in the vicinity of the mobile station will be relieved from experiencing a continuous alert signal being generated by the mobile station over a prolonged period. The mobile station then can wake from the alert sleep mode when presence of a user is detected, for example when movement of the mobile station is detected. The defined period can be a fixed value or can be a user selectable value.

Figure 1:
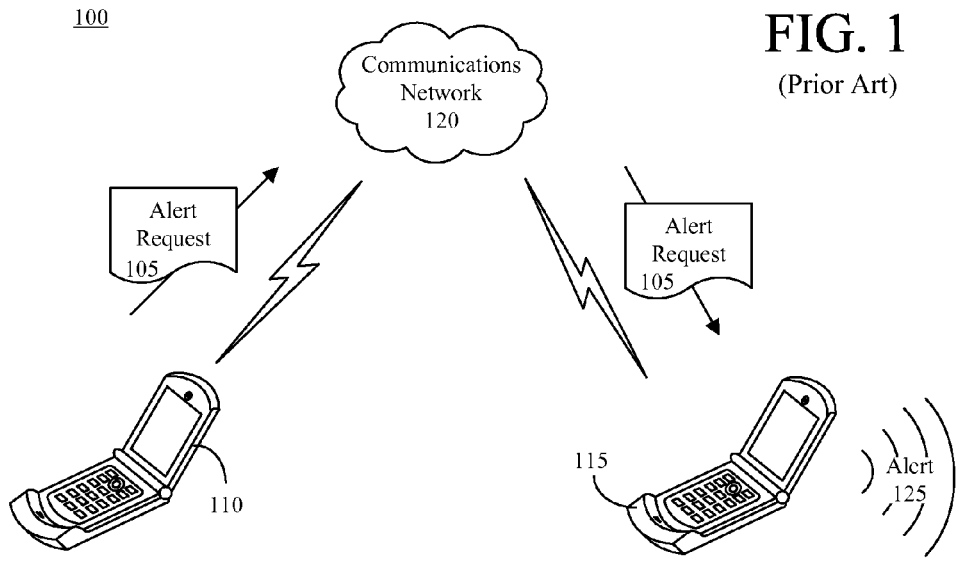
FIG. 1 depicts a communications system that is useful for understanding the present invention.
Figure 2:
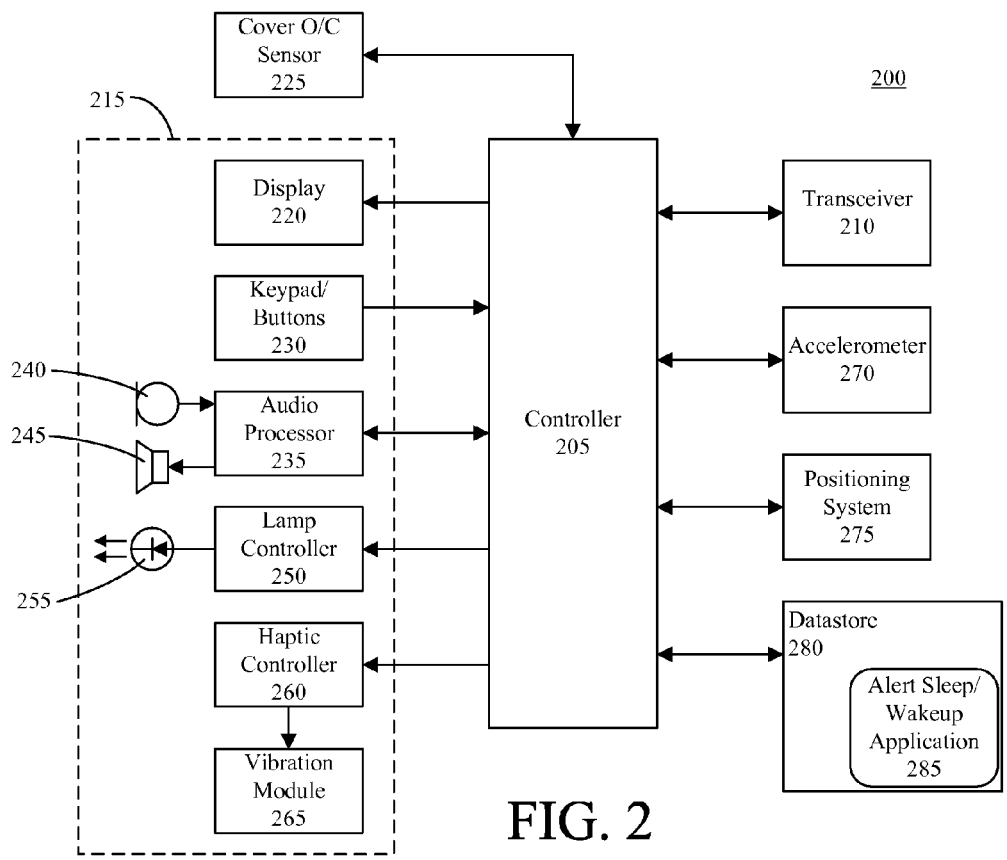
FIG. 2 depicts a block diagram of a mobile station that is useful for understanding the present invention.

FIG. 2 depicts a block diagram of a mobile station 200 that is useful for understanding the present invention. The mobile station 200 can be a mobile communication device, such as a mobile computer, a personal digital assistant (PDA) or a mobile telephone, or any other mobile electronic apparatus that may receive alert requests and generate alert signals. The mobile station 200 can include a controller 205. The controller 205 can comprise, for example, a central processing unit (CPU), a digital signal processor (DSP), an application specific integrated circuit (ASIC), a programmable logic device (PLD), a plurality of discrete components that cooperate to process data, and/or any other suitable processing device.

The mobile station 200 also can include a transceiver 210 that is used by the mobile station 200 to communicate with a communications network. The transceiver 210 can communicate data via IEEE 802 wireless communications, WPA, WPA2, GSM, TDMA, CDMA, WCDMA, direct wireless communication, TCP/IP, or any other suitable form of wireless communications.

A user interface 215 can be provided on the mobile station 200. The user interface 215 can include a keypad and/or buttons 230. The user interface 215 also can include a display 220. The display 220 can be a liquid crystal display (LCD), a liquid crystal on silicon (LCOS) display, a plasma display, a cathode ray tube (CRT), or any other display suitable for presenting menu items. In one arrangement, the display can be a touch screen that receives tactile user inputs. Further, in an arrangement in which the mobile station 200 includes a display 220 or cover that is operable between an open position and a closed position, the mobile station 200 can include one or more sensors 225 that detect whether the display or cover is open or closed.

Additional sensors (not shown) also can be provided. For instance, a thermocouple can be provided to detect a temperature changed caused by a user touching the mobile station 200. In another arrangement, an optical sensor can be provided to detect a change in light level caused by a user being proximate to the mobile station 200. In another arrangement, a biometric sensor can detect a user in contact with the mobile station 200. In yet another arrangement, an electric field sensor can detect a user in contact with, or proximate to, the mobile station 200. Still, any other type of sensors can operate with the mobile station 200 and the invention is not limited in this regard.

The user interface 215 further can include an audio processor 235, a lamp controller 250 and/or a haptic controller 260. The audio processor 235, lamp controller 250 and/or haptic controller 260 each can be integrated with the controller 205, or provided as separate components that are communicatively linked to the controller 205. For example, the audio processor 235, lamp controller 250 and/or haptic controller 260 each can comprise a CPU, a DSP, an ASIC, a PLD, a plurality of discrete components that cooperate to process data, and/or any other suitable processing devices.

The audio processor 235 can be connected to one or more input audio transducers 240 and one or more output audio transducers 245. In addition to processing speech signals, the audio processor 235 can generate a myriad of other audio signals, for instance ringtones and acoustic alert signals. For example, when an audio alert is generated by the audio processor 235, such alert can be communicated to the output audio transducer 245, which can generate a correlating acoustic alert signal.

The lamp controller 250 can control one or more indicator lamps 255. The lamp controller 250 can generate alert signals and communicate such signals to the indicator lamp 255, which then can present visual alert signals by emitting light. The light that is emitted can be pulsed or can be continuously generated. The indicator lamp 255 can comprise a light emitting diode (LED), or any other lamp suitable for generating visual alert signals.

The haptic controller 260 can control one or more haptic devices, such as a vibration module 265, to which the haptic controller 260 is operatively coupled. The vibration module 265 can vibrate the mobile station 200 in response to receiving suitable signals from the haptic controller 260. The vibration can be continuous or pulsed. Vibration modules are known to the skilled artisan.

The mobile station 200 also can include an accelerometer 270. Accelerometers are known to the skilled artisan. The accelerometer 270 can detect movement of the mobile station 200 by detecting acceleration of the mobile station 200, and can communicate a correlating signal to the controller 205 when the movement is detected.

In addition to the accelerometer 270, or in lieu of the accelerometer 270, the mobile station 200 can include a positioning system 275 that detects movement of the mobile station 200. The positioning system 275 can include, for example, a global positioning satellite (GPS) receiver that can receive and process GPS signals from global positioning satellites to detect movement of the mobile station 200. GPS receivers are known to the skilled artisan.

In another arrangement, the positioning system 275 can include a signal generator which generates a positioning signal that can be processed to determine the physical location of the mobile station 200. Such processing can be performed, for instance, by a positioning application instantiated with a communications network. Alternatively, signals transmitted by the transceiver 210 can be processed by the communications network to detect movement of the mobile station 200. The communications network also can detect movement of the mobile station 200 when the mobile station 200 establishes presence in an area, or cell, that is different than the area or cell in which the mobile station was present when the alert was generated in response to the alert request. For example, the communications network can detect a handoff of the mobile station 200 from a first network node, such as a base-transceiver station (BTS), a repeater or an access point, to a second network node.

In yet another arrangement, the mobile station 200 can detect its presence in an area or cell that is different than the area or cell in which it was present when the alert was generated. For example, the mobile station 200 can detect a handoff of the mobile station 200 from a first network node to a second network node. Still, movement of the mobile station 200 can be detected in any other suitable manner and the invention is not limited in this regard.

The mobile station 200 also can include a datastore 280. The datastore 280 can include one or more storage devices, each of which can include a magnetic storage medium, an electronic storage medium, an optical storage medium, a magneto-optical storage medium, and/or any other storage medium suitable for storing digital information. In one arrangement, the datastore 280 can be integrated into the controller 205. An alert sleep/wakeup application 285 can be contained on the datastore 280. The alert sleep/wakeup application 285 can be executed by the controller 205 to implement the methods and processes described herein.

In operation, the mobile station 200 can receive an alert request via the transceiver 210. The transceiver 210 can communicate the service request to the controller 205 which, in response, can communicate alert signals to the user interface 215. For example, the controller 205 can communicate the alert signals to the audio processor 235 and/or the lamp controller 250. The audio processor can process such alert signals to generate audio signals that are communicated to the output transducer 245, which can convert such signals to acoustic alert signals. Similarly, the lamp controller 250 can process the alert signals to generate signals to the indicator lamp 255, which can convert such signals to visual alert signals. Other alert signals can be provided and the invention is not so limited.

The alert signals can be deactivated by receiving an acknowledgement from a user that the alert signals have been received. The acknowledgement can be received by receiving a user input, such as an audio input received via the input audio transducer 240, a tactile input entered via the keypad and/or buttons 230, a signal from the cover open/close sensor 225 indicating that the cover or the display 220 of the mobile station 200 has been opened or closed, an input received via a biometric sensor (not shown), or the acknowledgement can be received in any other suitable manner.

If a user acknowledgement is not received within a defined period, the mobile station 200 can enter an alert sleep mode. Such process can be implemented by execution of the alert sleep/wakeup application 285 by the controller 205. In the alert sleep mode, the activation status of the alert can be changed. For instance, the controller 205 can cease communicating the alert signals to the audio processor 235 and/or the lamp controller 250, or the controller can communicate a deactivation signal to the audio processor 235 and/or the lamp controller 250, thereby deactivating the alert signals.

The controller 205 also can signal to the audio processor 235 to reduce a volume of the acoustic alert signal, change a frequency of the acoustic alert signal, and/or change a rate of repletion of the acoustic alert signal. Further, the controller 205 also can signal to the lamp controller 250 to change an intensity of the visual alert signal, change a color of the visual alert signal and/or change a rate of repetition of the visual alert signal. In another arrangement, when the sleep mode is entered, the controller 205 can deactivate the acoustic and/or visual alert signals, and activate the haptic controller to provide one or more signals to the vibration module 265 to initiate vibration of the mobile station 200.

The mobile station 200 can remain in alert sleep mode until a user presence is detected, at which time the mobile station 200 can awake from the alert sleep mode. The user presence can be detected in any suitable manner, for example, by detecting movement of the mobile station 200. For instance, the accelerometer 270 can detect movement of the mobile station 200, and provide a signal to the controller 205. In another arrangement, the positioning system 275 can detect movement of the mobile station and provide a corresponding signal to the controller 205. Alternatively, the mobile station 200, or the communications network to which the mobile station 200 is communicatively linked, can detect movement of the mobile station 200. Signals correlating to movement of the mobile station 200 can be processed by the controller 205 to wake the mobile station 200 from the alert sleep mode.

The user presence also can be detected in much the same way that a user acknowledgement is detected. For instance, user presence can be detected by receiving a user input, such as an audio input received via the input audio transducer 240, a tactile input entered via the keypad and/or buttons 230, or a signal from the cover open/close sensor 225 indicating that the cover or the display 220 of the mobile station 200 has been opened or closed. Moreover, the user presence can be detected by receiving a signal from a biometric sensor, an electric field sensor, an optical sensor, and/or a thermocouple. In one arrangement, redundancy can be implemented in the mobile station 200 by detecting the user presence using a plurality of techniques. Still, user presence can be detected in any other suitable manner and the invention is not limited in this regard.

Upon awakening, the controller 205 can resume a wake mode alert signal. For example, the controller 205 can communicate the alert signals to the audio processor 235 and/or the lamp controller 205 as previously discussed. In another arrangement, the controller 205 can communicate the alert signals to the haptic controller 260 when the mobile station awakes to cause vibration of the mobile station. Still, any other suitable alerts can be implemented when the mobile station awakes from sleep mode and the invention is not limited in this regard. The alert signal then can be deactivated in response to receiving a user acknowledgement, as previously described. In an arrangement in which user presence is sensed in the same manner that a user acknowledgement is received, for example via a user input, the first user input can wake the mobile station 200 from alert sleep mode and the second user input can deactivate the alert.

Figure 3:
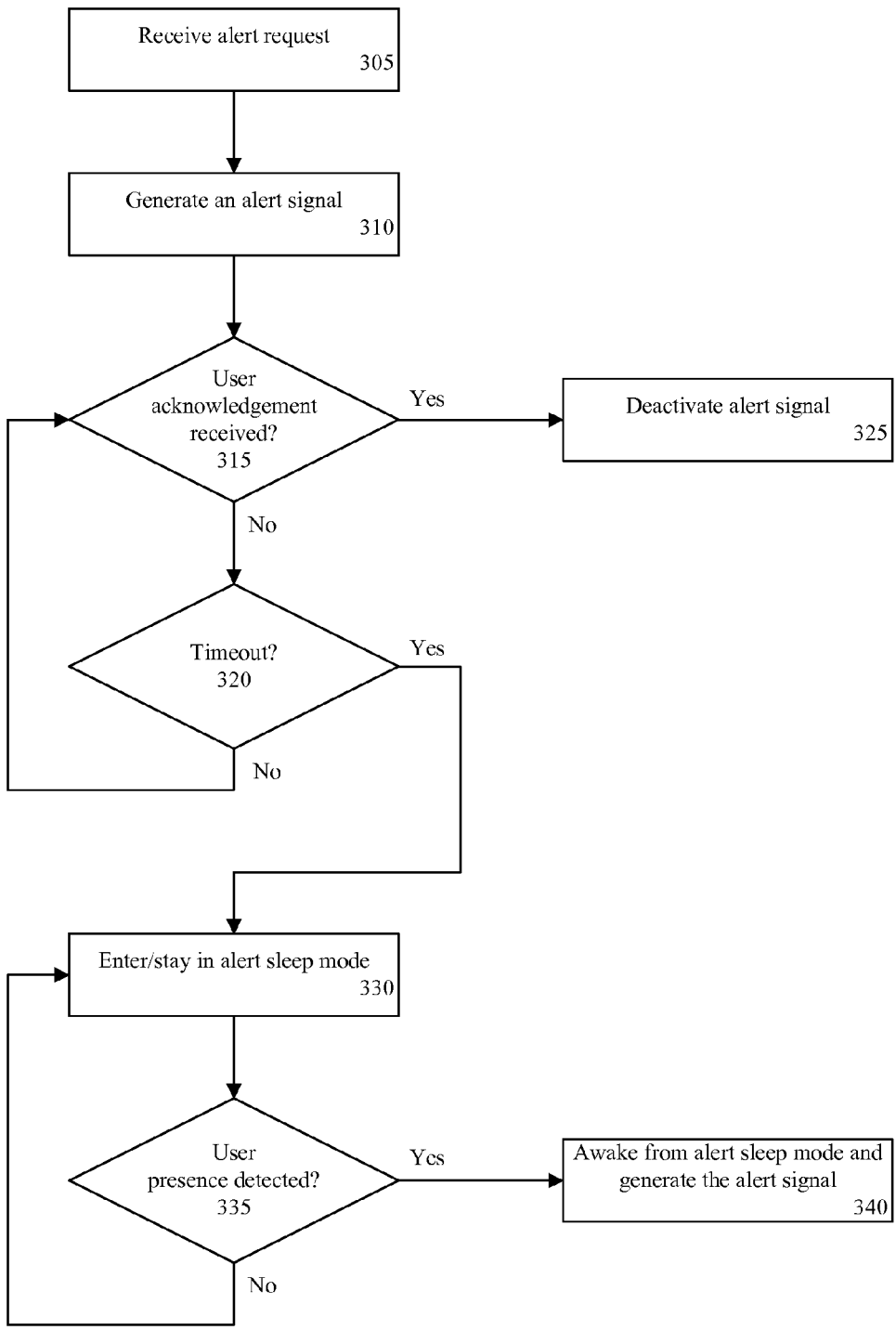
FIG. 3 is a flowchart that is useful for understanding the present invention.

FIG. 3 is a flowchart presenting a method 300 that is useful for understanding the present invention. Beginning at step 305, an alert request can be received on the mobile station. At step 310, an alert signal can be generated. Referring to decision box 315 and decision box 320, if a user acknowledgement is received prior to a timeout of a defined period, at step 325 the alert signal can be deactivated. If, however, the user acknowledgement is not received prior to timeout of the defined period, at step 330 the mobile station can enter into an alert sleep mode. When the mobile station enters alert sleep mode, at least one parameter of the alert signal can be changed. For example, as noted, the alert signal can be activated or changed. Proceeding to decision box 335, when a user presence is detected, the process can proceed to step 340 and the mobile station can awake from the sleep mode and generate the alert signal.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which, when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of controlling alert signals on a mobile station, comprising:
   in an alert active mode, the mobile station generating a wake mode alert signal in response to an alert request;
   responsive to not generating an acknowledgement to the wake mode alert signal within a predetermined period after initiating the wake mode alert signal, the mobile station entering into an alert sleep mode in which the wake mode alert signal is deactivated; and
   responsive to a signal representing a change of motion of the mobile station when in the alert sleep mode, the mobile station operable to awake the mobile station from the alert sleep mode to enter the mobile station into the alert active mode and the mobile station resuming generating the wake mode alert signal in response to the alert request.

2. The method of claim 1, wherein:
   the wake mode alert signal is an acoustic alert signal.

3. The method of claim 1, wherein:
   the wake mode alert signal is a visual alert signal.

4. The method of claim 1, wherein:
   the wake mode alert signal is an acoustic alert signal; and
   entering the mobile station into the alert sleep mode comprises generating a vibration alert signal.

5. The method of claim 1, wherein detecting the change in motion of the mobile station comprises detecting an acceleration of the mobile station.

6. The method of claim 1, wherein detecting the change in motion of the mobile station comprises receiving a positioning signal.

7. The method of claim 6, wherein detecting the positioning signal comprises receiving a global positioning satellite signal.

8. The method of claim 1, wherein detecting the change in motion of the mobile station comprises detecting a presence of the mobile station in an area or cell that is different than an area or cell in which the mobile station was present when the alert was generated.

9. The method of claim 1, wherein the mobile station is further operable to awake the mobile station from the alert sleep mode and enter the mobile station to the alert active mode in response to detecting user activity via a user interface of the mobile station when the mobile station is in the alert sleep mode.

10. The method of claim 1, wherein:
    the wake mode alert signal is a first acoustic alert signal; and
    entering the mobile station into the alert sleep mode comprises generating a second acoustic alert signal that is different than the first acoustic alert signal.

11. The method of claim 1, wherein:
    the wake mode alert signal is a first vibration alert signal; and
    entering the mobile station into the alert sleep mode comprises generating a second vibration alert signal that is different than the first vibration alert signal.

12. A mobile station, comprising:
    a transceiver that receives an alert request; and
    a controller coupled to the transceiver, the controller operable to:
       in an alert active mode, initiate generation of a wake mode alert signal by the mobile station in response to the alert request being received by the transceiver;
       enter the mobile station into an alert sleep mode in which the wake mode alert signal is deactivated in response to not receiving an acknowledgement to the wake mode alert signal within a defined period after initiating the wake mode alert signal; and
       responsive to detecting a user presence when in the alert sleep mode, awake the mobile station from the alert sleep mode to enter the mobile station into the alert active mode and reinitiate generation of the wake mode alert signal in response to the alert request.

13. The mobile station of claim 12, further comprising:
    an audio processor that generates the wake mode alert signal as an acoustic alert signal.

14. The mobile station of claim 12, further comprising:
    a lamp controller that generates the wake mode alert signal as a visual alert signal.

15. The mobile station of claim 12, further comprising:
    an audio processor that generates the wake mode alert signal as an acoustic alert signal;
    a haptic controller; and
    a vibration module operatively coupled to the haptic controller, the haptic controller providing a signal to the vibration module to initiate vibration of the mobile station in the alert sleep mode.

16. The mobile station of claim 12, further comprising an accelerometer that detects the user presence by detecting movement of the mobile station.

17. The mobile station of claim 12, further comprising a positioning system that detects the user presence by detecting movement of the mobile station.

18. The mobile station of claim 17, wherein the positioning system comprises a global positioning satellite receiver.

19. The mobile station of claim 12, wherein the mobile station detects a user presence by detecting a presence of the mobile station in an area or cell that is different than an area or cell in which the mobile station was present when the alert was generated.

20. The mobile station of claim 12, further comprising a user interface, wherein the user presence is detected by detecting user activity via the user interface.

21. The mobile station of claim 12, wherein:
the wake mode alert signal is a first visual alert signal; and
entering the mobile station into the alert sleep mode comprises generating a second visual alert signal that is different than the first visual alert signal.

22. A mobile station, comprising:
a transceiver that receives an alert request;
a transducer;
an accelerometer; and
at least one controller coupled to the transceiver, the transducer and the accelerometer, the at least one controller operable to:
responsive to the alert request, in an alert active mode, initiate generation of an acoustic alert signal by the transducer;
responsive to not receiving an acknowledgement to the acoustic alert signal within a defined period, enter the mobile station into an alert sleep mode in which the acoustic alert signal is not output by the transducer in response to the alert request; and
responsive to the accelerometer detecting movement of the mobile station while in the alert sleep mode, awake the mobile station from the alert sleep mode to enter the mobile station into the alert active mode and resume controlling output of the acoustic alert signal by the transducer in response to the alert request.

\* \* \* \* \*